W. H. PEDRICK.
Cotton-Harvesters.
No. 144,629.　　　　　　　　Patented Nov. 18, 1873.
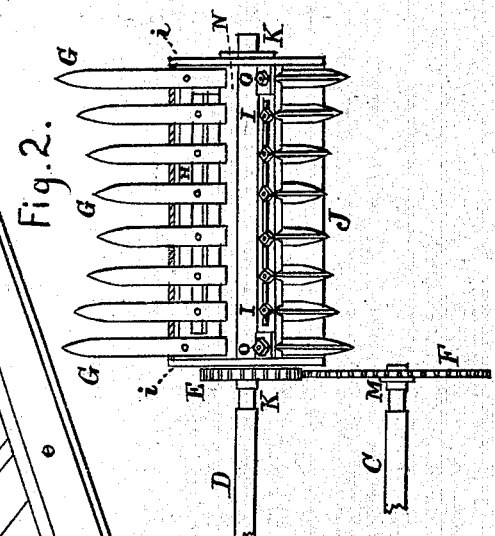
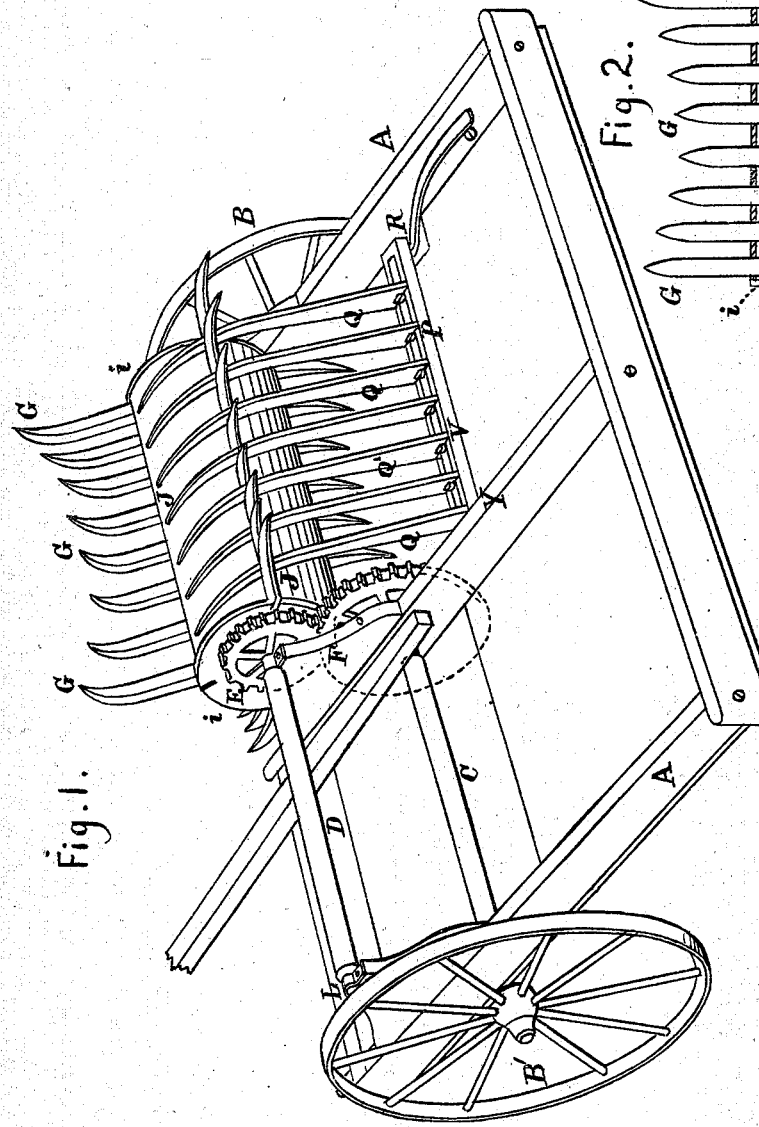
Witnesses:
H. A. Daniels
C. H. Goham
Inventor:
William H. Pedrick
per Sam'l S. Fisher
Atty

UNITED STATES PATENT OFFICE.

WILLIAM H. PEDRICK, OF RICHMOND, INDIANA.

IMPROVEMENT IN COTTON-HARVESTERS.

Specification forming part of Letters Patent No. 144,629, dated November 18, 1873; application filed March 27, 1873.

*To all whom it may concern:*

Be it known that I, WILLIAM H. PEDRICK, of the city of Richmond, county of Wayne, and State of Indiana, have invented certain Improvements in Cotton-Pickers, of which the following is a specification:

My invention relates, particularly, to the revolving cylinders of cotton-pickers; and consists in providing such cylinder with teeth of varying lengths; said cylinder being made to revolve in a direction opposite from that of the driving-wheel.

The objection to teeth of uniform length consists in their tendency to draw the outside branches of the plant toward the center of the cylinder, and thus crowd them on a few of the middle teeth, which is a serious objection. This is avoided by increasing the length of the teeth as they recede from the center of the cylinder in which they are located, as will be more fully hereinafter set forth.

In the accompanying drawings, Figure 1 is a rear perspective view of the machine, showing the cylinder with the teeth attached; and Fig. 2 is a side view of said cylinder with a section thereof removed to show one method of attaching said teeth to the same.

The detailed parts of a machine shown herein to embody my invention are the frame A; the ground-wheel B, and driving-wheel B'; the axle-shaft C; the cylinder-shaft D; the gear-wheel E; the pinion F; the cylinder-teeth G G, of different lengths, secured to the slotted bars H by means of the bolts and nuts I; the cylinder J, perforated to admit and firmly secure the teeth G; the journals K K of the cylinder-shaft, revolving in the boxes L L; the journal M of the driving-shaft; the slots N N in the bars H; the lugs O O on the cylinder-head *i i*; the slotted bars P of the rack V, holding adjustably the rack-teeth Q; and the spring R to press said rack-teeth against the cylinder.

The teeth of the cylinder are made, preferably, of a conical shape in their transverse section, the sides being slightly curved toward the apex, their dimensions varying in accordance with the strength of the material of which they are made. Regarding them in their transverse section as of conical shape, I usually make the base one-half an inch in width, and the height one and a half inch from base to apex, which latter is usually about an eighth of an inch wide, the whole tapering toward the point.

To more clearly specify my invention, I have described these teeth by pairs in their relative position in the cylinder, those two teeth farthest from the center being one pair, those two next in order another pair, and so on. As an equivalent for this variation, the teeth might be of uniform length, but so located in the cylinder that the outer teeth would strike the plant first, though the variation in length is preferable in use.

Instead of the bolts and nuts I, the bolts may be screwed into the teeth, thereby dispensing with the nuts.

The object of the slot in the bar H is, as above indicated, to secure a lateral adjustability in the teeth, to suit the size and condition of the branches. Said bars are secured to the cylinder-head through the medium of the lugs O O, or otherwise.

The rack-teeth Q have a similar lateral adjustment with that of the cylinder-teeth, and may be made to encircle said cylinder entirely; and, being then secured at both ends, may be more rigidly secured, though made to contain less metal.

What I claim is—

The cylinder of a cotton-picker provided with teeth arranged in pairs, the teeth of each outer pair being longer than those of the pair or pairs within it, substantially as described.

WILLIAM H. PEDRICK.

Witnesses:
 THOS. A. DUGDALE,
 WM. E. BELL.